United States Patent [19]
Plasser, deceased et al.

[11] 3,869,907

[45] Mar. 11, 1975

[54] TRACK SURVEYING APPARATUS

[76] Inventors: Franz Plasser, deceased, late of Johannesgasse 3, Vienna, Austria A-1010, by said Erna Plasser, heir; Josef Theurer, Johannesgasse 3, Vienna, Austria A-1010; Egon Schubert, Lainzerstra 24b/8, Vienna, Austria

[22] Filed: Feb. 19, 1974

[21] Appl. No.: 443,690

Related U.S. Application Data

[60] Continuation-in-part of Ser. No. 210,627, Dec. 21, 1971, which is a division of Ser. No. 813,854, April 7, 1969, Pat. No. 3,643,503.

[30] Foreign Application Priority Data

Apr. 9, 1968 Austria .............................. 3507/68

[52] U.S. Cl......................... 73/146, 33/144, 33/338
[51] Int. Cl......................... B61k 9/08, E01b 29/00
[58] Field of Search............. 73/146, 71.5; 104/7 R, 104/7 B, 8, 7 A; 33/144, 338

[56] References Cited
UNITED STATES PATENTS
3,481,183   12/1969   Swift..................................... 73/146

*Primary Examiner*—Donald O. Woodiel
*Attorney, Agent, or Firm*—Kurt Kelman

[57] ABSTRACT

Two track engaging devices spaced from each other in the direction of track elongation are mounted on a track survey car and means is provided for applying a mechanical force of different magnitude to each device to change the position of the track engaged thereby. A reference is associated with the track for determining the position changes in relation thereto and a measuring system is associated with the track engaging devices for continuously and simultaneously measuring any position changes resulting from the applied mechanical forces. The measuring system produces measuring signals corresponding to each of the measured position changes and includes a differentiating unit for producing a signal corresponding to the difference between any two simultaneously produced measuring signals.

9 Claims, 11 Drawing Figures

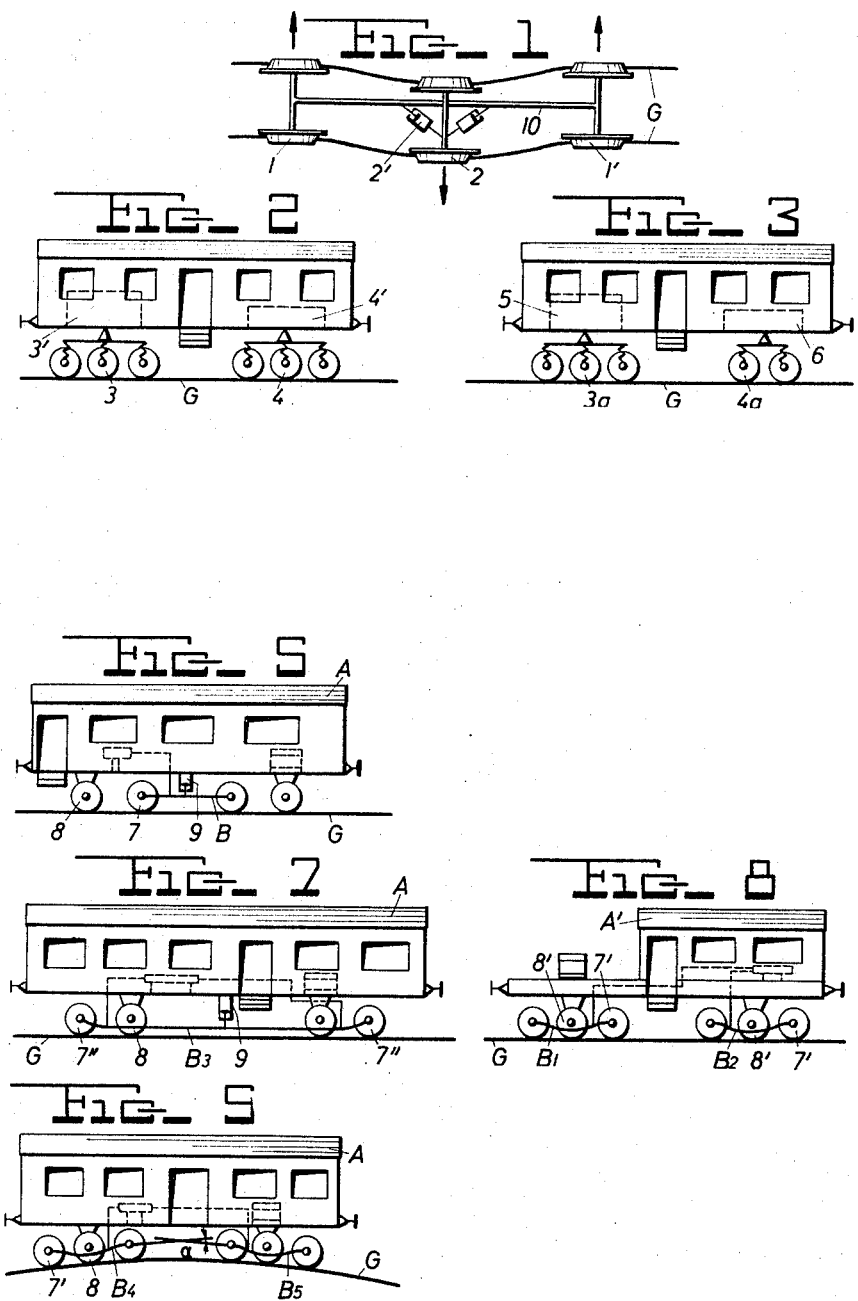

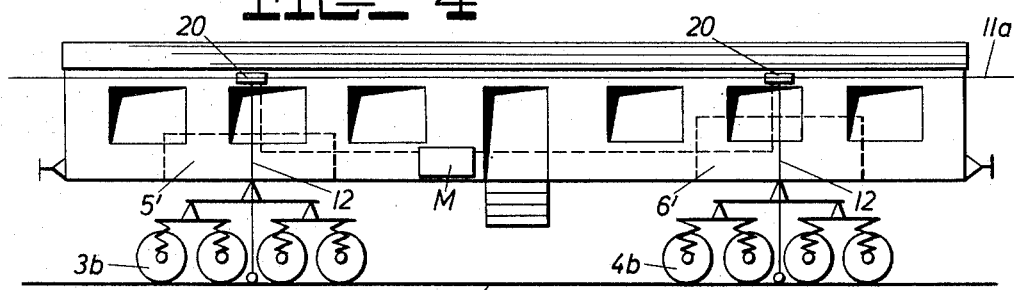
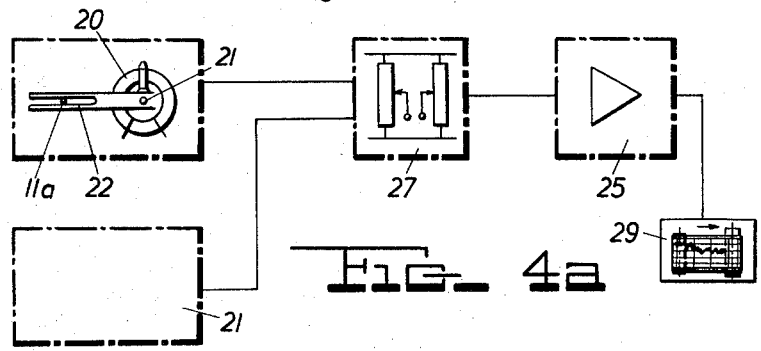
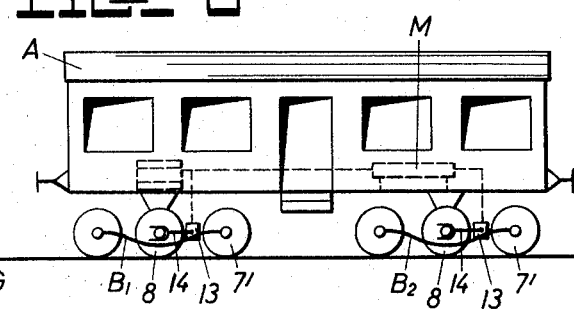
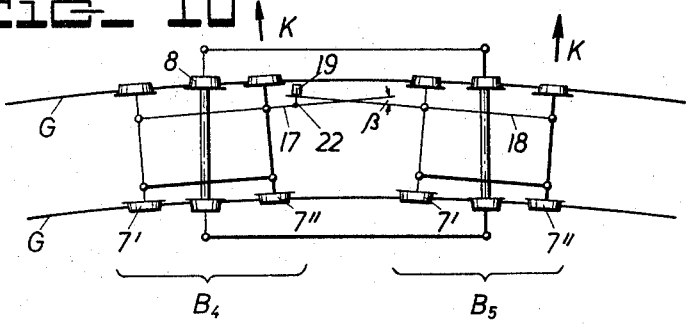

TRACK SURVEYING APPARATUS

This is a continuation-in-part of our copending application Ser. No. 210,627, filed Dec. 21, 1971, which is a division of our application Ser. No. 813,854, filed Apr. 7, 1969, now U.S. Pat. No. 3,643,503, dated Feb. 22, 1972.

The present invention relates to an apparatus for determining the physical condition of successive sections of a railroad track by means of a vehicle continuously moving on and along the track in the direction of track elongation.

Track survey cars are known to determine the grade, lining, gage, superelevation and skew of a track, as well as the condition of the rails and rail fastenings, by means of sensors contacting the track rails and indicating the position thereof in relation to an elongated vehicle frame serving as reference. However, it has not been possible with known track survey systems accurately to determine a "characteristic value" of the track condition in a single run.

It is the primary object of this invention to provide a track surveying apparatus which determines all essential characteristic values indicative of the physical condition of the track while continuously moving along the track without stopping at track points whose conditions are to be determined.

This and other objects are accomplished in accordance with the invention with an apparatus mounted on a vehicle arranged for mobility on a track in the direction of track elongation. Two track engaging devices are spaced from each other in the direction of track elongation and means is provided for applying a mechanical force of different magnitude to each track engaging device to change the position of the track engaged by the device. The position change is a function of the applied force. A reference is associated with the track for determining the position changes in relation thereto, and a measuring system is associated with the track engaging devices for continuously and simultaneously measuring any position changes resulting from the applied mechanical forces. The measuring system produces measuring signals corresponding to each of the measured position changes and includes a differentiating unit for producing a signal corresponding to the difference between any two simultaneously produced measuring signals.

The condition of a track or track part can be determined by the effect a test load or mechanical force applied to the track or track part has thereon. For instance, the stiffness of a track rail or the resilience or yield of a road bed, as well as other characteristics of the track, may be determined by obtaining a value characteristic of the changes in the shape or position of the track under controlled mechanical forces of different magnitude applied thereto. This fact is used in the present invention in a continuously advancing surveying operation.

The above and other objects, advantages and features of the present invention will be better understood by reference to the following detailed description of certain now preferred embodiments of apparatus according to this invention, taken in conjunction with the accompanying schematic drawing wherein FIG. 1 is a top view of the undercarriages of a vehicle arranged for mobility on a track in the direction of track elongation and of one embodiment of a track engaging device according to the invention;

FIGS. 2 to 9 are side views of vehicles incorporating different embodiments of the present invention;

FIG. 4a is a circuit diagram of a measuring system; and

FIG. 10 is a top view of the undercarriages and satellite carriages of the embodiment of FIG. 9.

Referring now to the drawing, a track surveying car (not shown) has a frame supported on undercarriages 1, 1' with wheels running on rails G of a railroad track in the direction of track elongation. A satellite carriage 2 is supported on the car frame intermediate, and spaced from, the undercarriages and has a track engaging device consisting of flanged wheels engaging the respective track rails. An axle 10 extending in the direction of track elongation interconnects the axles of the undercarriages. Means is provided for applying a horizontal mechanical force of a predetermined magnitude to the track engaging device, the illustrated means consisting of a pair of hydraulic motors 2' connecting the axle of the satellite carriage to axle 10.

Upon operation, the hydraulic motors apply a predetermined, variable, horizontal force, pressure or load upon a selected one of track rails G to change the lateral position of the track as a function of the applied force, i.e., the magnitude of the position change corresponds to the magnitude of the applied force. Reference line 11 is associated with the track for determining the position changes in relation thereto. The extent of the track position change under a predetermined force is characteristic of the local physical condition of successive track sections to which the mechanical force is applied as the vehicle moves over the track, such track conditions including the condition of the ballast bed, the condition of the track ties, the condition of the rail fastening means, etc. A suitable measuring system of any desired type (not shown in FIG. 1) is associated with the track engaging device 2 for continuously measuring any position changes resulting from the applied mechanical force exerted by hydraulic motors 2' and produces measuring signals corresponding to each of the measured position changes. While FIG. 1 shows ony a single track engaging device 2, two such devices will be mounted on the track survey car frame spaced from each other in the direction of track elongation and hydraulic pressures of different magnitude will be applied on the respective track engaging devices in accordance with this invention.

In all embodiments of the invention, the track is subjected to mechanical forces for the purpose of changing the shape or position of the track, the position change being a function of, or proportional to, the applied force. The position change is determined in relation to a reference associated with the track. A measuring system is associated with the track engaging devices for continuously and simultaneously measuring any track position changes resulting from the applied mechanical forces. Such measuring systems for producing measuring signals corresponding to a change of position of a track in relation to a reference are well known per se, as are measuring systems which, as herein, include a differentiating circuit or unit for producing a signal corresponding to the difference between any two simultaneously produced measuring signals.

In this manner, as the track survey car passes over the track, two track points or sections which are spaced apart from each other in the direction of track elongation are continuously and simultaneously subjected to mechanical forces of different magnitude, the resultant measuring signals are compared in the differentiating unit and the differentiating unit emits a signal corresponding to the difference between any two simultaneously produced measuring signals to indicate the condition of the track. This enables totally different track conditions of track sections at considerable distances from each other to be tested or surveyed under identical conditions simply by keeping the two applied mechanical forces or their ratios to each other identical.

The simultaneous application of two mechanical forces of different magnitude during the single passage of the track survey car is important since this assures that the track condition indicating measuring signal is obtained under identical test conditions in respect of vehicle speed and acceleration as well as track condition. If the two measuring signals to be compared were obtained during two successive surveys, this would not be possible since all conditions could not be kept identical during the second passage of the track survey car. For instance, during the second passage, the car may have to stop at a red signal which was green during the first passage, thus changing the conditions of speed and acceleration.

FIGS. 2 and 3 illustrate embodiments of track survey vehicles comprising a frame supported on undercarriages having flanged wheels running on the track and constituting the track engaging devices applying a force of different magnitude to the track at track points or sections spaced from each other in the direction of track elongation.

In the embodiment of FIG. 2, the track survey car runs on swivel trucks 3 and 4, the three axles of each truck being spring-connected to the frame of the truck. Loads 3' and 4' of different magnitudes are placed on the car frame above respective ones of the trucks so that the trucks apply different vertical mechanical forces to the track points or sections beneath the trucks as the car passes over the track G to change the vertical position of the track in relation to reference line 11a which extends in the direction of track elongation generally parallel to the track plane in a manner well known in track maintenance operations.

In the embodiment of FIG. 3, the swivel trucks 3a and 4a are subjected to loads 5 and 6 which may be of the same or a different magnitude, a difference in the downward mechanical force being assured by the difference in the number of axles of the two trucks.

In both embodiments, the track G is simultaneously and continuously subjected to mechanical forces of different magnitudes at points spaced apart from each other in the direction of track elongation as the track survey car advances in that direction along the track. The resultant track position changes are continuously measured and their signals compared to determine the physical condition of the track.

The embodiment of FIG. 4 is substantially identical with that of FIG. 2, except that each undercarriage has a pair of two-axled swivel trucks 3b and 4b subjected to loads 5' and 6' of different magnitude.

A useful measuring system for continuously measuring position changes of a track and producing measuring signals corresponding to each of the measured position changes is described, for instance, in U.S. Pat. No. 3,463,095, filed Nov. 13, 1967 and granted Aug. 26, 1969, the entire pertinent disclosure thereof is incorporated herein by reference. This measuring system uses rotary potentiometers.

Another useful measuring system is schematically illustrated, by way of example, in FIGS. 4 and 4a, this system being patterned after that described in copending application Ser. No. 214,082, filed Dec. 30, 1971, now U.S. Pat. No. 3,799,058 of which two of the joint inventors herein are the joint inventors and whose pertinent disclosure is incorporated herein by reference.

In this measuring system, vertical support rods 12, 12 run on rollers on track G in the range of each undercarriage and each support rod carries a two-part track level indicator shown in FIG. 4a to comprise one part consisting of fork member 22 having two tines wherebetween the tensioned reference wire 11a is constantly held, and another part consisting of rotary potentiometer 20 having a rotary shaft 21 whence fork member 22 extends radially, the two indicator parts thus being movable in respect of each other. Each change in the vertical position of track G in respect of associated reference wire 11a automatically causes a movement of the radial fork member and a corresponding adjustment of the potentiometer, the changed vertical position being due and corresponding to the mechanical downward force applied to the track by the respective undercarriage and the changed resistance in the potentiometer producing a corresponding measuring signal responsive to the change in the vertical track position.

The two measuring signals from potentiometers 20, 20 are continuously and simultaneously fed to measuring device M which, as shown in FIG. 4a, comprises a differentiating circuit unit 27 where the two signals are compared and whose output is a signal corresponding to the difference between any two simultaneously produced measuring signals. This output is fed to signal amplifier 25 whose amplified output feeds and operates indicating device 29 which is a moving band recorder wherein a stylus operated by the signal from amplifier 25 permanently records the track position changes, these changes being an indication of the track condition. If desired, the measuring signal may be fed to a computer, instead of or in addition to recorder 29. The computer may be programmed to store the received signals and/or to use them in any set survey program.

The embodiments of FIGS. 5 to 10 assure more accurate control of the mechanical forces applied to the track, thus producing more reliable signals characteristic of the measured track position changes and corresponding conditions of the track. In these embodiments, a track surveying vehicle runs on track G on from and rear axles or undercarriages, and at least one satellite carriage is mounted on the vehicles and moves on the track with the vehicle, each satellite carriage having track engaging devices, such as flanged wheels, spaced from each other and from the vehicle axles in the direction of track elongation. Means is provided for applying a mechanical force of a predetermined magnitude on the track engaging devices of each satellite carriage.

In the embodiment of FIG. 5, track survey car A runs on axles 8 on track G and carries satellite carriage B intermediate the car axles. The satellite carriage, in turn, has two axles 7 also running on track G and engaging the same by means of flanged wheels. Hydraulic motor 9 is mounted on the survey car and connects the satellite carriage to the car to apply a mechanical force of controlled magnitude upon the carriage and its track engaging wheels. The extent of any change in the vertical position of the track in response to the mechanical force exerted by motor 9 will depend on the controlled hydraulic pressure and the condition of the track, and this position change may be determined in relation to the survey car frame serving as a reference or a reference line, as in the embodiments of FIGS. 1 to 4. The reference line may be a tensioned wire or an electromagnetic radiation beam of any suitable type.

Again, the two measuring signals coming from loaded axle 8 and the satellite carriage will be compared to produce a survey signal at measuring device M.

In the embodiment of FIG. 6, two satellite carriages $B_1$, $B_2$ are mounted on track survey car A, for instance in a manner more fully described and illustrated in our copending U.S. application Ser. No. 243,619 filed Apr. 13, 1972, now U.S. Pat. No. 3,828,440 each satellite carriage being arranged in the region of car axles 8, 8, with axles 7', 7' of the satellite carriages spaced from the car axles at either side thereof. This produces four successive track points at which controlled and measurable mechanical force may be applied to the track by the satellite carriage axles. The transducer comprises rotary potentiometer 13 mounted on the satellite carriage and having a rotary shaft whence rod 14 extends with a forked end engaging the adjacent car axle 8. Movement of the axle and carriage in relation to each other will rotate the potentiometer shaft to produce a corresponding control signal. In one modification, a mechanical force of a magnitude different from the load on axles 8 is applied to the satellite carriages so that the control signal corresponds to the difference between the depression in the track caused by the load on the axles and the mechanical force applied to the satellite carriages. In another modification, no mechanical force is applied to the satellite carriages so that the difference is between the load on the axles depressing the track more heavily than the load-free carriages. In either modification, the differences in the magnitudes of the mechanical forces or loads applied to the car axles and the satellite carriages causes a pivoting of rod 14 and a corresponding rotation of the potentiometer shaft to produce a desired control signal.

The embodiment of FIG. 7 differs from that of FIG. 5 only in that axles 7'', 7'' of satellite carriage $B_3$ are arranged outside car axles 8, 8 instead of therebetween, so that the satellite carriage axles exert a downward force on track G at or near the two ends of the survey car.

Further variation of the applied mechanical forces is possible with the embodiment of FIG. 8 wherein the downward force exerted by axles 8', 8' of track survey car A' also differs, one of the axles being loaded more heavily than the other. This is accomplished by making the car asymmetric so that one axle 8' carries a heavier load than the other axle 8'. The same result would be achieved by placing different loads upon the respective axles, as in FIGS. 2 to 4, for example. Additional relatively small downward pressure is exerted upon the track by satellite carriages $B_1$, $B_2$ mounted in the same manner as shown in FIG. 6.

The embodiment of FIGS. 9 and 10 differs from that of FIG. 6 is the special mounting of satellite carriages $B_4$, $B_5$ on track survey car A, enabling the apparatus not only to apply mechanical forces of different magnitude to the track in a vertical and/or horizontal direction but also to determine, measure and compare changes of position of the satellite carriages in relation to each other and to the survey car.

The corresponding measuring signals may be produced by measuring angle $\alpha$ in a vertical plane and/or angle $\beta$ in a horizontal plane between lines extending in the direction of track elongation and constituted, for instance, by rods 15, 16 or 17, 18 on the satellite carriages. The angles are defined between associates lines of the two carriages, one line extending in a direction determined by the position of the one carriage $B_4$ and the other line extending in a direction determined by the position of the other carriage $B_5$.

Angle $\alpha$ may again be measured by an electromechanical transducer of the previously indicated type, a rotary potentiometer being affixed to one of the rods and a radially extending fork member mounted on its rotary shaft and holding the other rod between its tines. Movement of one rod in relation to the other will thus produce a correspondingly changing output signal at the potentiometer.

An equivalent transducer may consist of a coil potentiometer having a coil 19 affixed to one rod 18 and a plunger 22 affixed to the other rod 17 whereby movement of the plunger in relation to the coil changes the electric current in the coil and the corresponding output signal.

FIG. 10 also shows axles 7'', 7'' of the satellite carriages subjected to lateral forces K while the carriages themselves serve as a reference or datum line in relation to which characteristic track values may be measured. As shown in this figure, when the survey car moves in a track curve, one of the flanged wheels of front axles 7', 7' of the satellite carriages automatically is pressed with its rim against the head of the grade rail while the rear carriage axles 7'', 7'' have an indeterminate position. Therefore, it is sufficient to limit the lateral force to the rear axles.

Satellite carriages $B_4$ and $B_5$ have frames constituted by linked rods which are freely movable in relation to each other so that all their flanged wheels may engage the rails with their rims and thus follow the course of the track rails even when same are skew, for instance in a superelevated track section, such as a curve. Such satellite carriages may then be used to measure the twist in the track rails by using the relative positions of the axles of each carriage and of the axles of the neighboring carriages.

FIG. 10 shows the satellite carriages laterally pressed by forces K against the grade rail whose position is to be surveyed, these carriages or parts thereof serving as reference in relation to which, for instance by measuring angle $\beta$, the characteristic values of the track condition are determined.

If desired, any of the illustrated loads may consist of, or include, vibrators to apply a vibratory mechanical force to the track, in which case means for measuring the rail vibrations are provided to produce signals characteristic of certain track conditions, electro-acoustical vibration meters being well known. Vibratory mechanical force may also be applied to the track by flattened wheels on the satellite carriages to produce successive impacts on the track rails as the survey car moves therealong.

As will be appreciated, the schematically illustrated embodiments of surveying apparatus are merely illustrative of the concepts underlying the present invention and may be used in a great variety of ways. For instance, the mechanical forces, to which the track is subjected from the continuously moving surveying vehicle, may be so controlled from track point to track point as to vary as a function of the physical conditions at each point to produce a predetermined, constant value of measured changes of these conditions, for instance changes in the shape or position of the track or track part which has been subjected to the mechanical force. The varying sizes of the mechanical forces give a signal characteristic of the local conditions of the track. On the other hand, the size of the mechanical forces may be kept constant to produce varying values as a function of the measured changes of the track conditions, and the varying values of the measured changes give signals characteristic of the local condition of the track.

The track is subjected to mechanical forces of different magnitudes at two points of the track spaced from each other in the direction of track elongation as the surveying vehicle continuously moves on and along the track. The resultant track changes, i.e., reshaping or repositioning of the track, are measured and compared to use the measured differences as a characteristic of a given track condition. Such continuously produced signals are particularly useful in an automated operation which permits the signals to be continuously received, recorded and evaluated, for instance in a computer.

Variations within this surveying system are possible. Thus, the mechanical forces of different magnitudes may be successively exerted upon the same track point. For instance, with the vehicle shown in FIG. 8, the different pressures of the front and rear vehicle axles will be exerted upon the same track point successively as the vehicle moves along the track, the differences in the track shape or position being measured at each axle, and then compared. In this case, the track is simultaneously subjected to mechanical forces of different magnitude at spaced points. Thus, while the changed track condition produced by a relatively small mechanical force is measured at one point, the changed track condition produced by a larger mechanical force is simultaneously measured at a point spaced therefrom.

In the illustrated embodiments, the mechanical forces are loads or pressures in a horizontal and/or vertical direction exerted directly or indirectly upon one or both track rails.

The type and the direction of the mechanical forces will depend on the characteristic of the track which is to be determined. For instance, the condition of the rails and the ballast bed is determined by exerting vertical pressures on the track. The condition of the rail fastenings and the track tie positions, which are largely determined by the ballast density at the ends of the ties, can be determined on the basis of track shape or position changes produced by horizontal or lateral pressures on the track. For instance, if the two track rails are pressed in opposite lateral directions at the same or at least about the same track point, the resultant changes in the shape or position of the track rails can be used to generate signals characteristic of the condition of the tie position or the rail fastening at this point.

Similar results are produced if the mechanical force consists of rail vibration-producing means, rather than vertical and/or horizontal pressure means, the resultant vibrations in the rail or rails being preferably measured electro-acoustically for obtaining signals characteristic of track conditions, such as the condition of the rails and rail fastenings but also the position of the track ties and the condition of the ballast bed.

The more types and/or sizes of mechanical forces are exerted upon the same track point, the more accurate and clear will be the determination of the track condition at this point obtained by the signals resulting from the measured changes in the track produced by these varying forces. A composite picture of the track condition may then the produced by feeding these varying signals to punch cards or directly to a computer for evaluation. Each combination of signals produces a composite picture which tells the track maintenance expert the condition of the track and its parts at each track point, the accuracy of this picture depending primarily on the number of measured values at each point. This shows the importance and considerable advantage of subjecting each track point successively to different mechanical stresses, particularly stresses of different magnitudes.

What we claim is:

1. An apparatus mounted on a vehicle arranged for mobility on a track in the direction of track elongation for determining the physical condition of successive sections of the track over which the vehicle moves, comprising
   1. two track engaging devices spaced from each other in the direction of track elongation;
   2. means for applying a mechanical force of different magnitude to each of the track engaging devices to change the position of the track engaged by the devices, the position change being a function of the applied force;
   3. a reference associated with the track for determining the position changes in relation thereto; and
   4. a measuring system associated with the track engaging devices for continuously and simultaneously measuring any position changes resulting from the applied mechanical forces, the measuring system producing measuring signals corresponding to each of the measured position changes and including
      a. a differentiating unit for producing a signal corresponding to the difference between any two simultaneously produced measuring signals.

2. The apparatus of claim 1, wherein the track engaging devices are axles with flanged wheels engaging the rails of the track.

3. The apparatus of claim 1, wherein the reference is a reference line.

4. The apparatus of claim 1, wherein the mechanical forces are vertically directed.

5. The apparatus of claim 1, wherein the mechanical forces are horizontally directed.

6. The apparatus of claim 1, wherein the mechanical force is a vibratory force.

7. The apparatus of claim 1, further comprising computer means connected to the differentiating unit and receiving the differentiated signal therefrom.

8. The apparatus of claim 1, wherein the vehicle has a frame supported on undercarriages running on the track and comprising satellite carriages having said track engaging devices and spaced from the undercarriages in the direction of track elongation, the satellite carriages being supported on the vehicle frame.

9. The apparatus of claim 1, wherein the vehicle has a frame supported on undercarriages having flanged wheels running on the track, the undercarriages constituting the track engaging devices and applying a force of different magnitude to the track.

* * * * *